United States Patent
Novlan et al.

(10) Patent No.: US 10,567,954 B2
(45) Date of Patent: Feb. 18, 2020

(54) INTEGRATED ACCESS BACKHAUL UNDER A NON-STANDALONE NETWORK ARCHITECTURE FOR 5G OR OTHER NEXT GENERATION NETWORK

(71) Applicant: AT&T Intellectual Property I, L.P., Atlanta, GA (US)

(72) Inventors: Thomas Novlan, Austin, TX (US); Milap Majmundar, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 59 days.

(21) Appl. No.: 15/874,587

(22) Filed: Jan. 18, 2018

(65) Prior Publication Data
US 2019/0223002 A1 Jul. 18, 2019

(51) Int. Cl.
H04W 4/00 (2018.01)
H04W 8/22 (2009.01)
H04W 72/04 (2009.01)

(52) U.S. Cl.
CPC ......... H04W 8/22 (2013.01); H04W 72/0406 (2013.01)

(58) Field of Classification Search
CPC ............. H04W 36/14; H04W 72/0453; H04W 72/0493; H04W 88/10
See application file for complete search history.

(56) References Cited

U.S. PATENT DOCUMENTS

| | | | |
|---|---|---|---|
| 8,509,214 B2 | 8/2013 | Liu et al. | |
| 8,565,150 B2 | 10/2013 | Hu et al. | |
| 8,755,324 B2 | 6/2014 | Yu et al. | |
| 8,855,138 B2 | 10/2014 | Horn et al. | |
| 8,971,233 B2 | 3/2015 | Moberg et al. | |
| 9,125,133 B2 | 9/2015 | Ji et al. | |
| 9,350,515 B2 | 5/2016 | Tellado et al. | |
| 9,413,502 B2 | 8/2016 | Tellado et al. | |
| 2006/0153233 A1 | 7/2006 | Chen et al. | |
| 2010/0103845 A1 | 4/2010 | Ulupinar et al. | |
| 2012/0020278 A1* | 1/2012 | Moberg | H04B 7/155 370/315 |
| 2013/0286930 A1 | 10/2013 | Nagata et al. | |
| 2015/0155930 A1 | 6/2015 | Liu et al. | |

(Continued)

OTHER PUBLICATIONS

International Search Report and Written opinion received for PCT Application Serial No. PCT/US2018/065819 dated Mar. 6, 2019, 19 pages.

(Continued)

*Primary Examiner* — Minh Trang T Nguyen
(74) *Attorney, Agent, or Firm* — Amin, Turocy & Watson, LLP

(57) ABSTRACT

In a 5G network, new radios (NR) can be deployed as a standalone radio access technology or as a non-standalone radio access technology assisted by another radio access technology. Long-term evolution (LTE), which is widely deployed can provide seamless coverage and uninterrupted connectivity, however NRs can provide significantly increased data rates or new services. However, the deployment of NR can be limited to hotspots under the footprint of LTE. Therefore, dual connectivity between LTE and NR can be utilized for non-standalone NR because control plane functions can be sent over LTE while the data plane can be managed on NR, allowing for simplified NR deployments where device support for both LTE and NR is available.

20 Claims, 12 Drawing Sheets

(56) References Cited

U.S. PATENT DOCUMENTS

| | | | | |
|---|---|---|---|---|
| 2015/0327150 | A1* | 11/2015 | Jung | H04W 36/14 |
| | | | | 370/254 |
| 2017/0207995 | A1* | 7/2017 | Gao | H04L 45/36 |
| 2017/0230880 | A1 | 8/2017 | Oroskar et al. | |
| 2017/0251077 | A1* | 8/2017 | Kumar Eerpini | H04L 67/327 |
| 2017/0359855 | A1 | 12/2017 | Jiao et al. | |
| 2018/0092142 | A1* | 3/2018 | Han | H04W 16/14 |

OTHER PUBLICATIONS

Santos et al., "A SDN controller architecture for Small Cell Wireless Backhaul using a LTE Control Channel", IEEE 17th International Symposium on a World of Wireless, Mobile and Multimedia Networks (WOWMOM), Jun. 1, 2016, 3 pages.

Tu Berlin, "Wireless Internet Routing", URL: https://www.inet.tu-berlin.de/fileadmin/fg234 teaching/SS11/IR SS11/ir11_wireless_03 in_the beginning.pdf, Dec. 31, 2011, pp. 1-119.

QUALCOMM Incorporated, "IAB—Control-plane Aspects", URL: http://www.3gpp.org/ftp/tsg%5Fran/WG2%5FRL2/TSGR2%5FAHs/2018%5F01%5FNR/Docs/, 3GPP TSG-RAN WG2 NR Ad hoc 1801, R2-1800414, Jan. 22-26, 2018, 3 pages.

QUALCOMM Incorporated, "IAB—User-plane Aspects", URL: http://www.3gpp.org/ftp/tsg%5Fran/WG2%5FRL2/TSGR2%5FAHs/2018%5F01%5FNR/Docs/, 3GPP TSG-RAN WG2 NR Ad hoc 1801, R2-1800413, Jan. 22-26, 2018, 4 pages.

AT&T et al., "New SID Proposal: Study on Integrated Access and Backhaul for NR", URL: http://www.3gpp.orgjftpjMeetings 3GPP_SYNC/RAN/Docs/, 3GPP TSG RAN Meeting #77, RP-171880, Sep. 11-14, 2017, 5 pages.

\* cited by examiner

INTEGRATED ACCESS BACKHAUL UNDER A NON-STANDALONE NETWORK ARCHITECTURE FOR 5G OR OTHER NEXT GENERATION NETWORK

TECHNICAL FIELD

This disclosure relates generally to facilitating integrated access and backhaul in 5G new radio (NR) networks. For example, this disclosure relates to facilitating radio resource control (RRC) procedures, radio resource management (RRM), and radio link monitoring (RLM) of integrated access and backhaul traffic in a non-standalone access (NSA) radio network architecture for a 5G, or other next generation network, air interface.

BACKGROUND

5th generation (5G) wireless systems represent a next major phase of mobile telecommunications standards beyond the current telecommunications standards of 4th generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to an operation of integrated access backhaul under a non-standalone network architecture is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
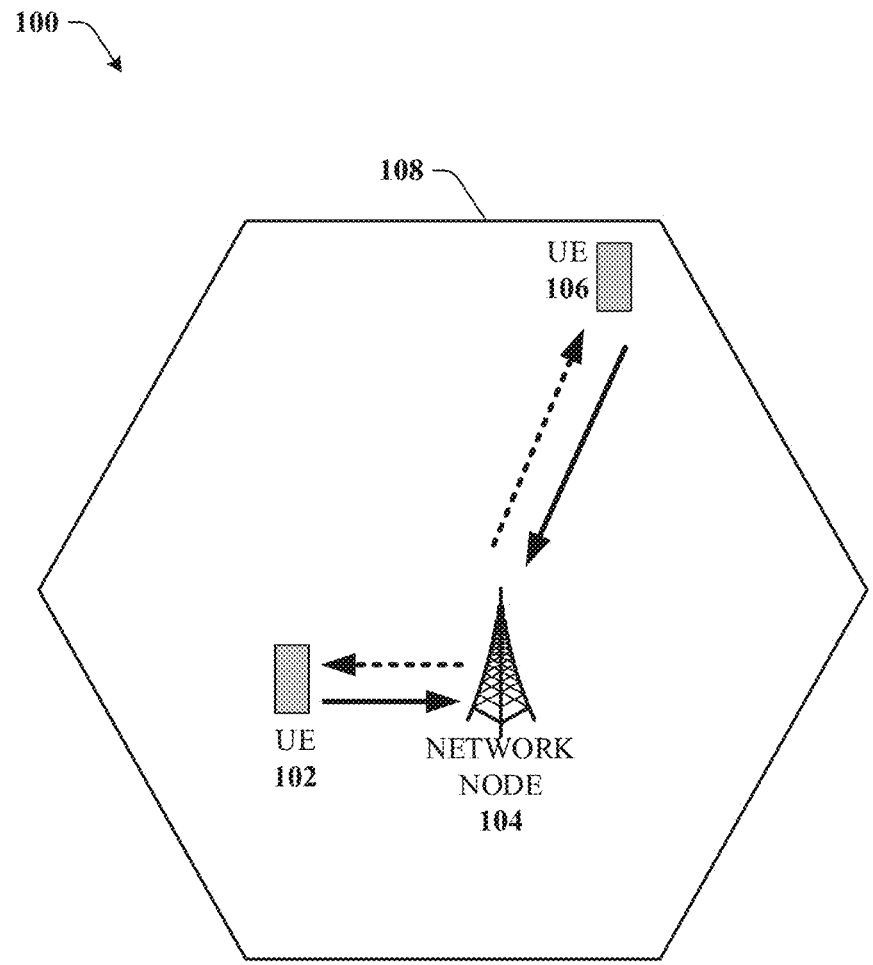
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate operation of integrated access backhaul under a non-standalone network architecture for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate operation of integrated access backhaul under a non-standalone network architecture for a 5G network. Facilitating operation of integrated access backhaul under a non-standalone network architecture for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

New radios (NR) can be deployed as a standalone (SA) radio access technology or as a non-standalone (NSA) radio access technology assisted by another radio access technology. LTE, which is widely deployed can provide coverage and uninterrupted connectivity. Although NR can provide significantly increased data rates or new services, the deployment can be limited to hotspots under the footprint of LTE. Dual connectivity between LTE and NR can facilitate NSA NR because control plane functions can be sent over LTE while the data plane is managed on NR, allowing for simplified early NR deployments where device support for both LTE and NR is expected. Future deployments may migrate to a standalone NR operation, where control plane information is also sent over NR.

3GPP NR-based 5G mobile networks can be deployed using a split RAN protocol architecture such that on the user plane, the packet data convergence protocol (PDCP) sublayers reside at a centralized unit (CU), while the RLC, MAC, and PHY layers reside at a distributed unit (DU). User plane data can be carried on data radio bearers (DRBs) that traverse the above described user plane RAN protocol architecture. On the control plane, signaling radio bearers (SRBs) can be set up to carry control messages from the RRC layer and utilize the PDCP layer at the CU. The control messages can further be carried down through the RLC, MAC, and physical (PHY) layers at the DU to be delivered to the UE over an over-the-air interface. The network users can be allocated over multiple DRBs and SRBs by the network. The network interface between the CU and DU is called the F1 interface per 3GPP specifications.

3GPP can enable future cellular network deployment scenarios and applications to support wireless backhaul and relay links to enable flexible and dense deployment of NR cells without the need for densifying the transport network proportionately. Due to the expected larger bandwidth available for NR, compared to LTE (e.g. mmWave spectrum) along with the native deployment of massive MIMO or multi-beam systems in NR, there is now an opportunity to develop and deploy integrated access and backhaul links. This can allow for easier deployment of a dense network of self-backhauled NR cells in a more integrated manner by building upon many of the control and data channels and/or procedures defined for providing access to UEs.

Under NSA operation, access UEs can be connected to the network by performing initial access procedures (e.g. synchronization signal detection and random access procedure) via LTE. The UEs can then access one or more NR cells via dual connectivity procedures such as secondary node addition. IAB nodes can also leverage a mechanism for performing initial access in order to set-up connectivity between nodes depending on the relay topology (e.g. tree, connected graph, mesh, etc.). For NSA, the initial access can be performed via LTE. Thus the IAB nodes can support LTE functionality and can perform synchronization and/or random access using the same signals and channels. However, since the UE functionality for IAB UEs is not fully identical with access UEs (e.g., optimized physical layer parameters, support for control plane messaging related to relay route/topology management) the network should be able to identify which UEs performing initial access are normal access UEs or IAB nodes with UE functionality. In one example, the network can identify relay nodes based on core network signaling (e.g. from a mobility management entity) or from the use of reserved random access channel (RACH) resources and/or preambles for IAB node UEs.

Furthermore, the configuration of physical and higher layer parameters can be via system information broadcast (SIB). In order to support efficient configuration of such parameters, for LTE and NR operation, a special SIB message (e.g., SIB_IAB) can be introduced, which only IAB node UEs (e.g., relay distributed unites) can be configured to receive and utilize. In another example, these parameters can be provided by higher layer signaling (e.g., RRC) in order to provide resource allocation for FDM/TDM/SDM of one or more access and backhaul links, which can be a function of the relay node or hop order specific.

In addition, by operating under an NSA architecture, where initial access and mobility are provided by the sub-6 GHz anchor carrier, there is no need to support idle mode operation on the IAB nodes themselves. For example, system information broadcast, paging, and other idle mode transmissions do not need to be sent on the mmWave bands, thus reducing the overall overhead required to support multiplexing of access and backhaul traffic.

In order to support multi-hop relaying between one or more IAB nodes as well as multi-connectivity and redundant connectivity, the IAB nodes can exchange routing information and/or tables indicating routes for access and/or backhaul traffic across one or more relay link hops. If this is performed on the NR backhaul links, there can be latency in exchanging messages across multiple hops. This is both due to multiplexing control transmissions (e.g., providing route and/or topology management related messages) with access traffic as well as the latency incurred in sending out these messages, which need to propagate over multiple hops before it can be confirmed.

Instead of routing, topology adaptation messages can be provided over the sub-6 GHz anchor carrier (e.g. LTE), and they can be quickly aggregated by a centralized routing control entity (e.g. at the eNB or NR CU) since they only need to traverse a single hop (on the sub6-GHz control link). The routing management messages can include initial routing and/or topology setup, routing and/or topology change, and routing and/or topology removal or teardown. In one example, the IAB routing updates can be provided by higher layer signaling (e.g., RRC messages) from the IAB nodes via the sub6-GHz anchor carrier (e.g. LTE). In another example, the signaling can be periodic, and the IAB nodes can be triggered by the anchor node to provide any updates to the routing and/or topology. In yet another example, the routing information can be provided to the IAB nodes from the sub6-GHz anchor. This can be provided by unicast control message updates (e.g., RRC or DCI) or by broadcast signaling (e.g., SIB or group common DCI).

In addition, to a periodic routing and/or topology update procedure, a periodic or event-driven approach can be utilized where the routing update request and response messages are provided after a routing and/or topology change is made either locally or globally, impacting one or more IAB nodes under the coverage of the sub6-GHz anchor nodes. In another example, the route management signaling (e.g., request/update) can be provided independently for each relay node. However, in many cases, routing updates can impact multiple relay nodes simultaneously (e.g., change to an end-to-end route). As a result, redundant signaling can be incurred by independent signaling. In this case, one or more relay nodes can be configured to be the primary node (e.g., the node with the smallest hop order of a given route) sending routing updates for a group of relay nodes/links. In this case, routing updates can be propagated to other nodes via LTE or NR signaling mechanisms.

In addition, in order to perform route management and selection, measurements of NR backhaul link quality, along with other metrics (e.g. traffic load, latency, etc.), can be performed and exchanged across the backhaul network topology. However, under an NSA architecture, the configuration, triggering, and exchange of CSI/RRM measurements for route management can be provided over the sub6-GHz anchor carrier instead of over the NR backhaul links. This is beneficial to reduce the overhead of such signaling, as well as enable global aggregation of measurements across multiple hop orders at a centralized route management entity (e.g., co-located with LTE eNB/NR gNB CU). These measurement exchanges can be part of the normal access UE measurement and reporting framework or can involve specialized signaling for IAB nodes, with independent configuration of measurement and reporting parameters, to support multi-hop measurement aggregation and events. This can also include the reporting of radio link failure and/or outage events over the sub6-GHz anchor links to assist in fast reconfiguration of routing and/or topology management, which may not be applicable for access UEs.

In addition, the measurement framework can support both fixed and mobile relays (e.g., drones, cars, etc.) by enabling mobility events to be handled by the sub6-GHz carrier without requiring disruption of the ongoing relaying on the mmWave band. For example, under a dual connectivity framework between the sub6-GHz and mmWave links for the relay nodes, a handover on sub6-GHz may not result in an SN-change (or other mobility event) on the mmWave NR carrier.

5G services can comprise both enhanced mobile broadband (eMBB) and ultra-reliable low latency communications (URLLC). In an NSA IAB architecture, URLLC services can be supported via the sub6-GHz anchor carrier, while other services can go through the mmWave NR multi-hop relay architecture. This is beneficial since, due to the strict latency requirements of URLLC services, it may be challenging to support URLLC in a multi-hop relay architecture. In one alternative, the URLLC bearer can be provided directly from the sub6-GHz anchor carrier directly to the access UE. In another alternative, the network can configure a dedicated URLLC bearer from the LTE eNB to NR serving DU over the sub6-GHz anchor carrier and then sent to the UE over NR on mmWave.

In one embodiment, described herein is a method comprising facilitating, by a wireless network device comprising a processor, transmitting control plane signaling update request data, representative of a control plane signaling update request for a control plane signaling update, to a base station device. In response to the facilitating of the transmitting, the method can comprise facilitating, by a first wireless network device, receiving the control plane signaling update from the base station device. Based on the facilitating the receiving, the method can also comprise facilitating, by the first wireless network device, receiving a data plane signaling update, from a second wireless network device. In response to the facilitating of the receiving the control plane signaling update and data plane signaling update, the method can comprise facilitating, by the first wireless network device, relaying the data plane signaling update to a mobile device.

According to another embodiment, a system can facilitate sending, to a base station device, control plane signaling update request data associated with a control plane signaling update request for a control plane signaling update. In response to the sending, the system can facilitate receiving, from the base station device, the control plane signaling update. Based on the receiving the control plane signaling update, the system can also receive, from a wireless network device of a wireless network, a data plane signaling update. Consequently, in response to the receiving the control plane signaling update and data plane signaling update, the system can relay the data plane signaling update to a user device of the wireless network.

According to yet another embodiment, described herein is a machine-readable storage medium that can perform the operations comprising transmitting, to a base station device, routing update request data representative of a routing update request for a routing update. In response to the transmitting, the machine-readable storage medium can receive the routing update from the base station device. In response to the receiving, the machine-readable storage medium can receive, from the base station device, topology update data representative of a topology update. Consequently, the machine-readable storage medium can transmit, to the base station device, an acknowledgement associated with the receiving the topology update data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
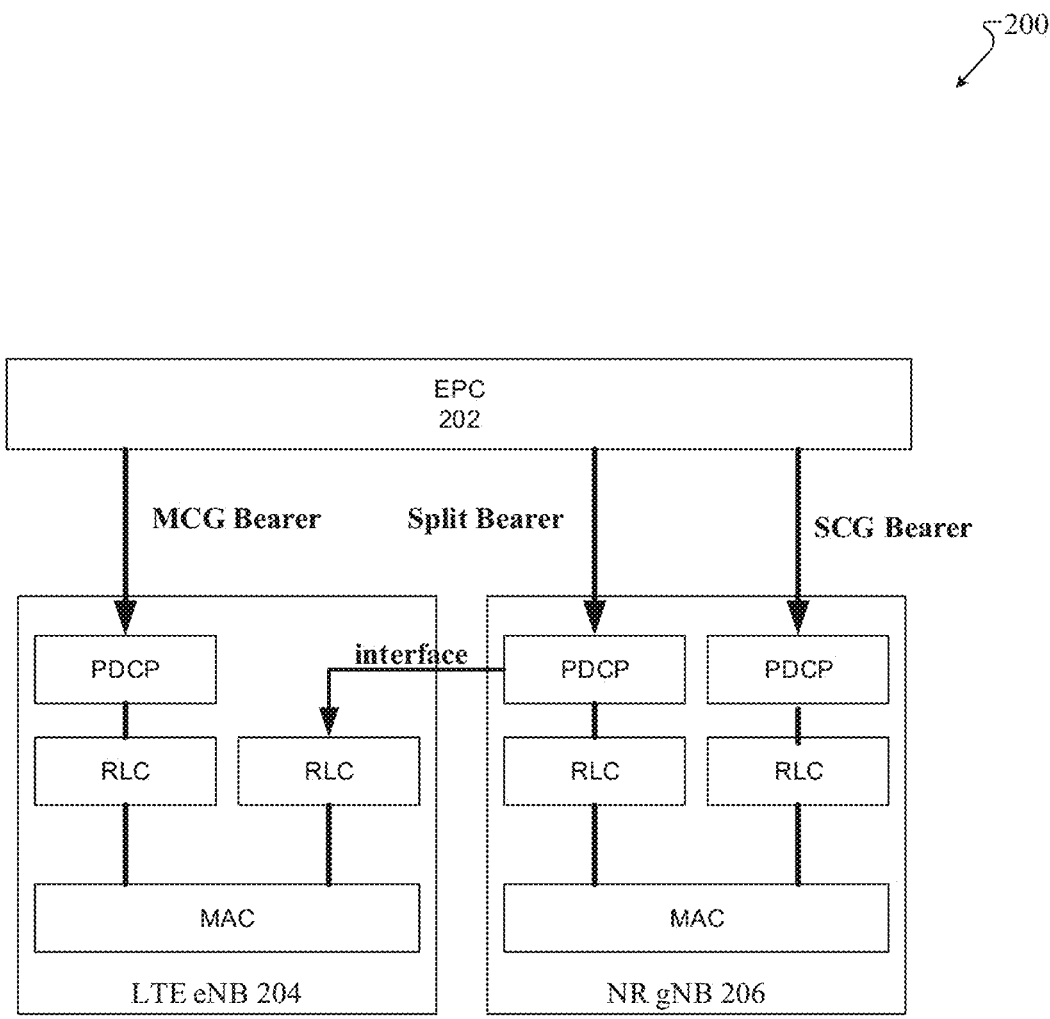
FIG. 2 illustrates an example schematic system block diagram of a non-standalone architecture according to one or more embodiments.

Referring now to FIG. 2, illustrated is an example schematic system block diagram of a non-standalone architecture 200 according to one or more embodiments. A baseline NSA architecture is illustrated in FIG. 2 where the MCG bearer providing control plane functionality is sent via LTE, while user plane traffic can be sent over both LTE and NR. As illustrated in FIG. 2, the evolved packet core (EPC) network 202 can provide data traffic and management control of the NR gNB 206. Both the LTE eNB 204 and the NR gNB 206 both have the ability to serve traffic that is on these bearers via packet data convergence protocols (PDCP), radio link controls (RLC), and medium access controls (MAC). However, the LTE eNB is called the master bearer (e.g., MCG bearer) because it is in charge of the control plane function, and the NR gNB 206 is called the secondary bearer (e.g., SCG bearer) because it is in charge of the data traffic. However, the split bearer allows traffic to be split between LTE and NR. Primarily, the control plane data is sent over the MCG bearer. This shows that there has to be functionality on the gNB to accommodate the control signaling going over LTE.

Figure 3:
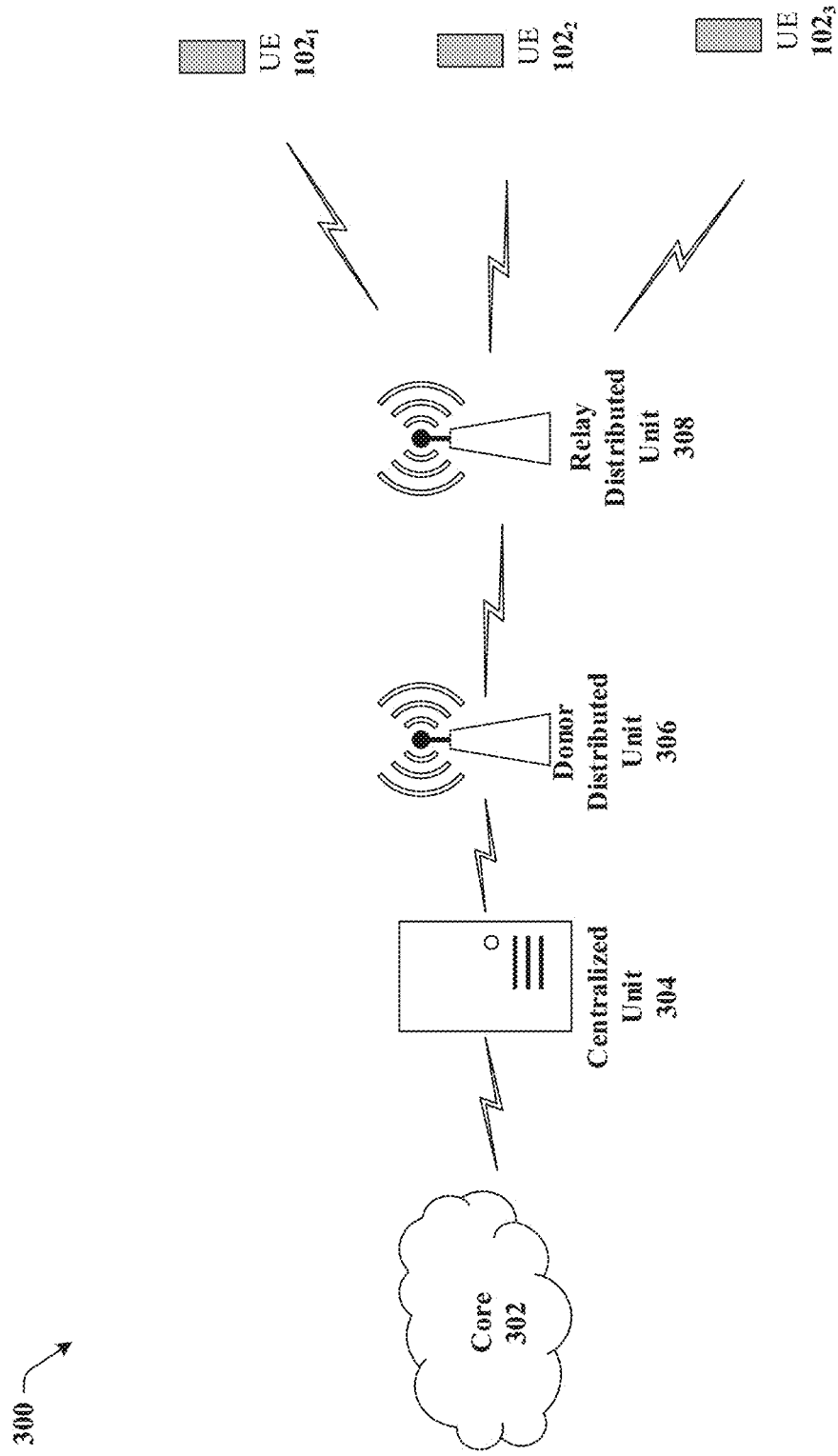
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. For example, the network 300, as represented in FIG. 3 with integrated access and backhaul links, can allow a relay node to multiplex access and backhaul links in time, frequency, and/or space (e.g. beam-based operation). Thus, FIG. 3 illustrates a generic IAB set-up comprising a core network 302, a centralized unit 304, donor distributed unit 306, relay distributed unit 308, and UEs $102_1$, $102_2$, $102_3$. The donor distributed unit 306 (e.g., access point) can have a wired backhaul with a protocol stack and can relay the user traffic for the UEs $102_1$, $102_2$, $102_3$ across the IAB and backhaul link. Then the relay distributed unit 308 can take the backhaul link and convert it into different strains for the connected UEs $102_1$, $102_2$, $102_3$. Although FIG. 3 depicts a single hop (e.g., over the air), it should be noted that multiple backhaul hops can occur in other embodiments.

Figure 4:
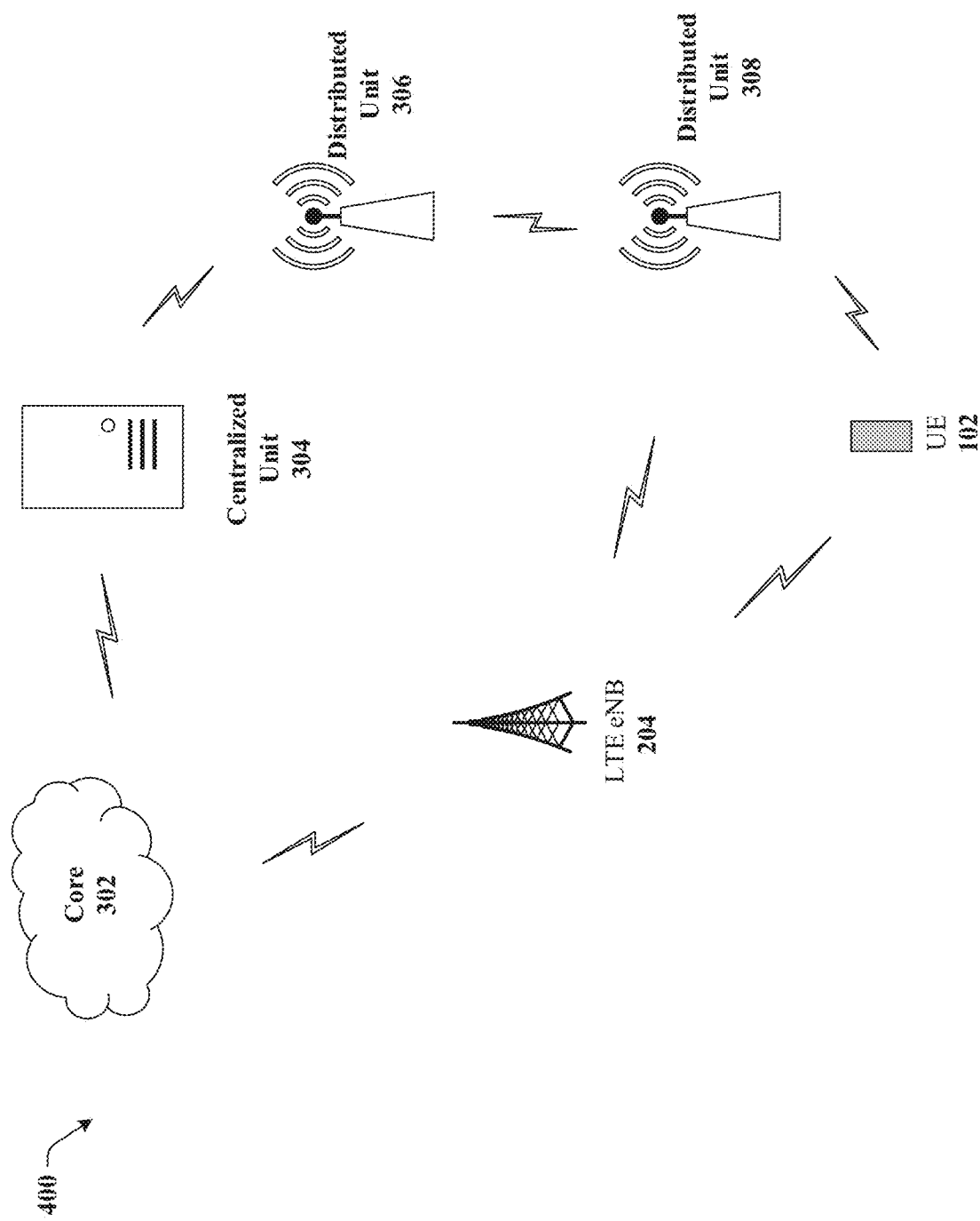
FIG. 4 illustrates an example schematic system block diagram of integrated access and backhaul operating under a non-standalone architecture according to one or more embodiments.

Referring now to FIG. 4, illustrated is an example schematic system block diagram of integrated access and backhaul operating under a non-standalone architecture 400 according to one or more embodiments. FIG. 4 depicts a combination of FIG. 2 (e.g., NSA) and FIG. 3 (e.g., IAB). For example, in this scenario, since the control plane for the UEs $102_1$, $102_2$, $102_3$ and the relay distributed unit 308 are provided over LTE, there are several advantages, including more robust signaling in case of NR operation on mmWave bands where radio link outage events can occur. In addition, the ability to provide route management and optimization via LTE signaling can reduce overhead of control plane traffic on backhaul links and global topology awareness and optimization. Furthermore, it should be noted that while the description of the solutions mainly describe NSA operation where the NR backhaul links are operating on mmWave bands and the control plane links are operating on sub-6 GHz LTE bands, it should be understood that this can be extended to scenarios where the sub-6 GHz anchor carrier providing control plane functionality can also be based on NR.

The first time IAB nodes are powered on, they can join the network, be recognized as relay nodes, and be setup with a relay topology to begin forwarding data. So the relay nodes support the LTE functionality and are able to support LTE. However the LTE network has to understand that the relay nodes are not normal UEs and that they are actually relay devices. Therefore, messaging can allow the LTE network to differentiate (e.g., broadcast signaling) between the UEs and the relay devices. Thus, for IAB a new type of system information broadcast (SIB) can be provided which can configure radio resources for IAB (e.g., each hop can have a different set of parameters broadcast by the LTE network).

The LTE eNB 204 can have connectivity with the UE 102 and the relay distributed unit 308. Thus, the LTE eNB 204 can provide control plane functionality directly (e.g., lower frequency carrier) to the UE 102 and the relay distributed unit 308. However, the data traffic for the UE 102 can be sent over the NR relays: donor distributed unit 306 (e.g., higher frequency carriers), and relay distributed unit 308. Thus, the UE 102 can receive control plane traffic from the LTE eNB 204 and data traffic from the relay distributed unit 308 via an interface between the relay distributed unit 308 and the UE 102.

Figure 5:
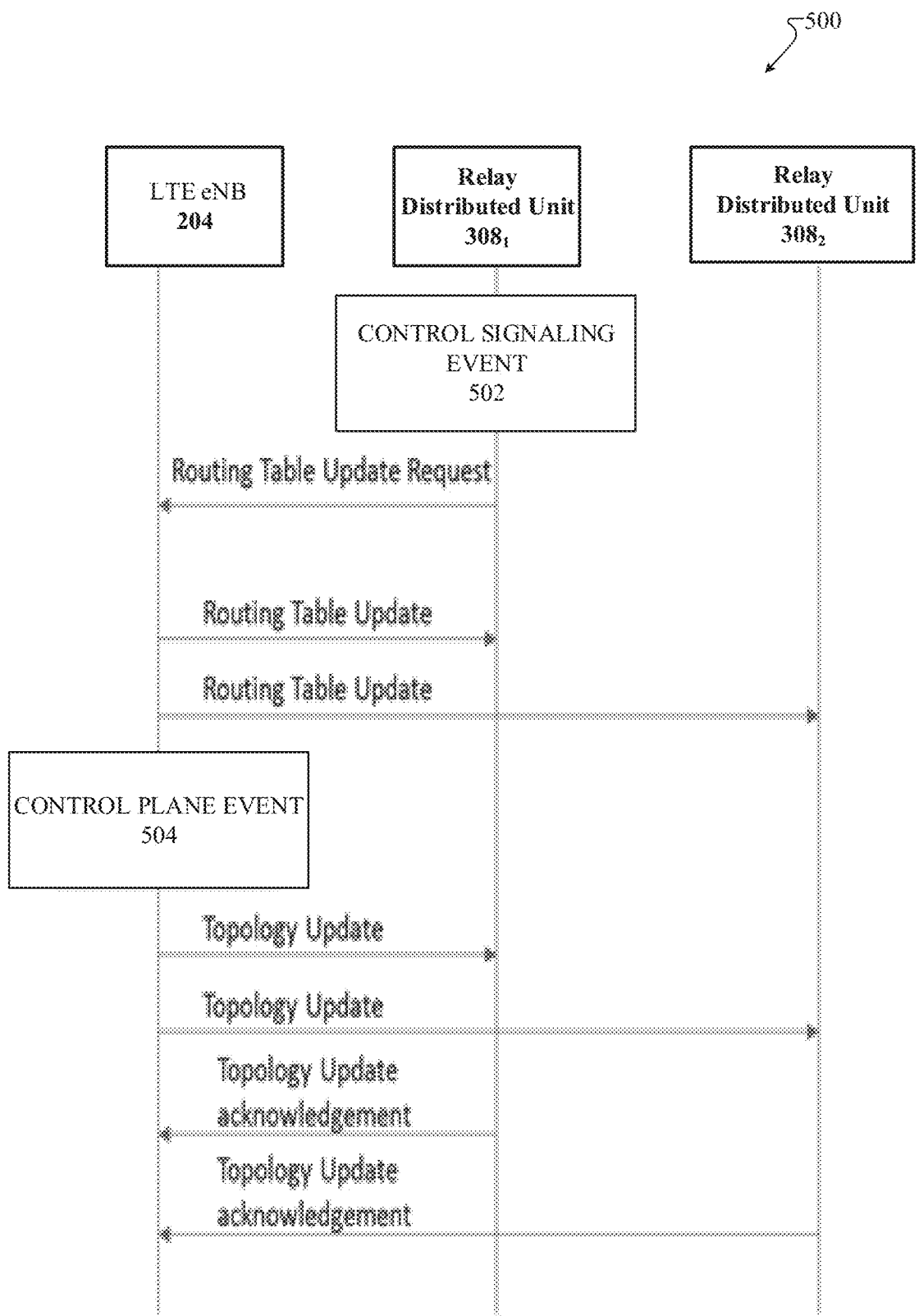
FIG. 5 illustrates an example schematic system block diagram of routing and topology update procedures according to one or more embodiments.

Referring now to FIG. 5 illustrates an example schematic system block diagram of routing and topology update procedures according to one or more embodiments. Local routing updates can be initiated by the relay UEs based on routing change events, while global topology changes can be provided by the LTE eNB 204 (e.g., anchor node) on the basis of topology change events. Consequently, if a route needs to be changed, a relay node can make a request (e.g., via transmission signaling) that the LTE eNB 204 broadcast this change. For example, a relay distributed unit $308_1$ can experience a control signaling event 502, wherein the control signaling event 502 can comprise a routing selection, initial access, radio measurements, and/or backhaul, etc. Thus, a routing table update request can be sent to the LTE eNB 204, and the LTE eNB 204 can send the routing table update to the relay distributed unit $308_1$ in response to receiving the routing table update request. The LTE eNB 204 can also send the routing table update to another relay distributed unit $308_2$ in response to receiving the routing table update request. Additionally, when the LTE eNB 204 experiences a control plane event 504, wherein the control plane event 504 can comprise a topology update (e.g., a topology removal, a topology teardown, etc.), the LTE eNB 204 can send the topology update to the relay distributed unit $308_1$, and/or the relay distributed unit $308_2$. Consequently, in response to receiving the topology updates, the relay distributed unit $308_1$, and/or the relay distributed unit $308_2$ can send topology update acknowledgements to the LTE eNB 204 to confirm receipt of the topology updates and to confirm that the relay distributed units are changing their configuration based on the update information.

Because the LTE eNB 204 covers a wider network than the relay distributed units, transmitting the updates via the LTE eNB 204 can be more efficient than transmitting the updates via hops from one relay distributed unit to another relay distributed unit. The transmission signaling can occur during a certain period based on network traffic and/or the number of relay distributed units found within the network. The request for updated routes can also occur based on route measurements (e.g., NR backhaul link quality, traffic load, latency, etc.). For example, if the backhaul link quality has reduced, the relay distributed unit $308_1$ can send a request to the LTE eNB 204 for route management to be provided by the LTE eNB 204 as opposed to the distributed unit $308_1$ continuing its current operations. In other embodiments, all of the relay distributed units $308_1$, $308_2$ can be triggered simultaneously to take route measurements, measurement reports can be centralized in one place, and/or the relay distributed units $308_1$, $308_2$ can be mobile and report different route measurements at different locations. In another embodiment, updates from multiple relay distributed units can be aggregated and sent to a primary relay distributed unit, and in other embodiments, the primary relay distributed unit can send data to multiple secondary relay distributed units. It should also be noted that although FIG. 5 only depicts two relay distributed units, that other embodiments can comprise any number of relay distributed units and/or donor distributed units.

Figure 6:
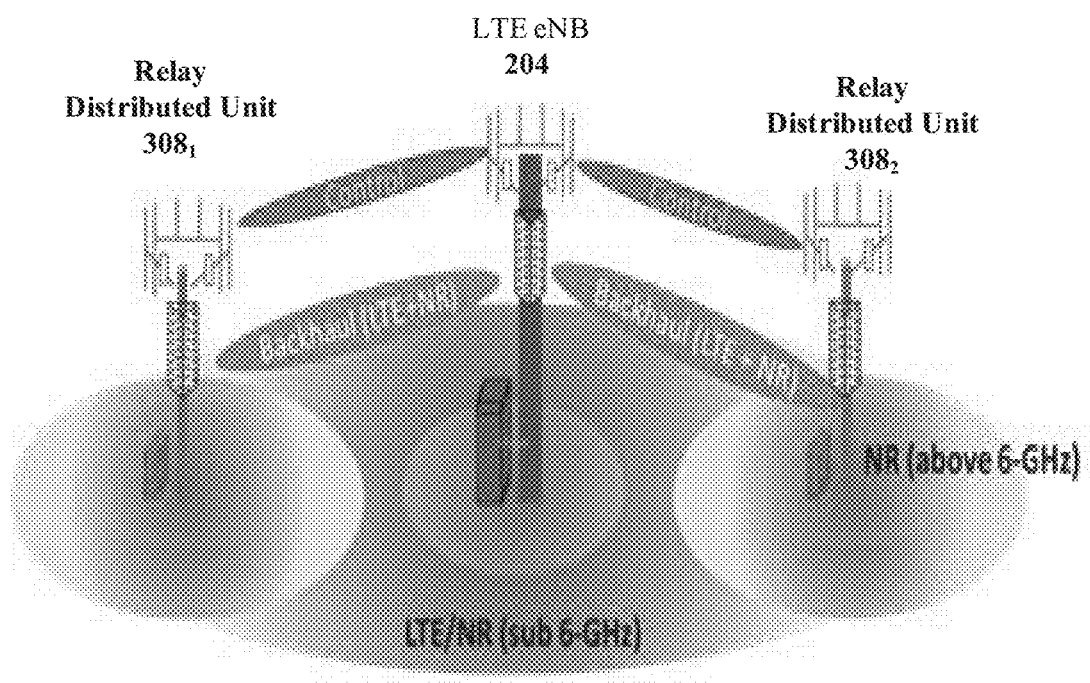
FIG. 6 illustrates an example schematic system block diagram of out-of-band relaying of long-term evolution of new radio mmWave bands according to one or more embodiments.

Referring now to FIG. 6, illustrated is an example schematic system block diagram of out-of-band relaying of LTE of new radio mmWave bands according to one or more embodiments. In addition to IAB nodes (e.g., relay distributed units $308_1$, $308_2$) supporting LTE UE functionality in order to operate under an NSA architecture, the IAB nodes (e.g., relay distributed units $308_1$, $308_2$) can also be co-located with a LTE eNB 204. In this case the backhaul link can be for sub-6 GHz traffic, mmWave traffic, or both. The control plane for the relay distributed units $308_1$, $308_2$ can still be provided via the sub-6 GHz channel, but the access traffic for sub6-GHz can be multiplexed on the NR backhaul link as depicted in FIG. 6. Thus, the routing topology and management can be separately handled for sub6-GHz and mmWave bands or can be determined jointly based on overall metrics such as combined throughput, latency, quality of service (QoS), and/or traffic load and resource utilization across multiple hops.

Figure 7:
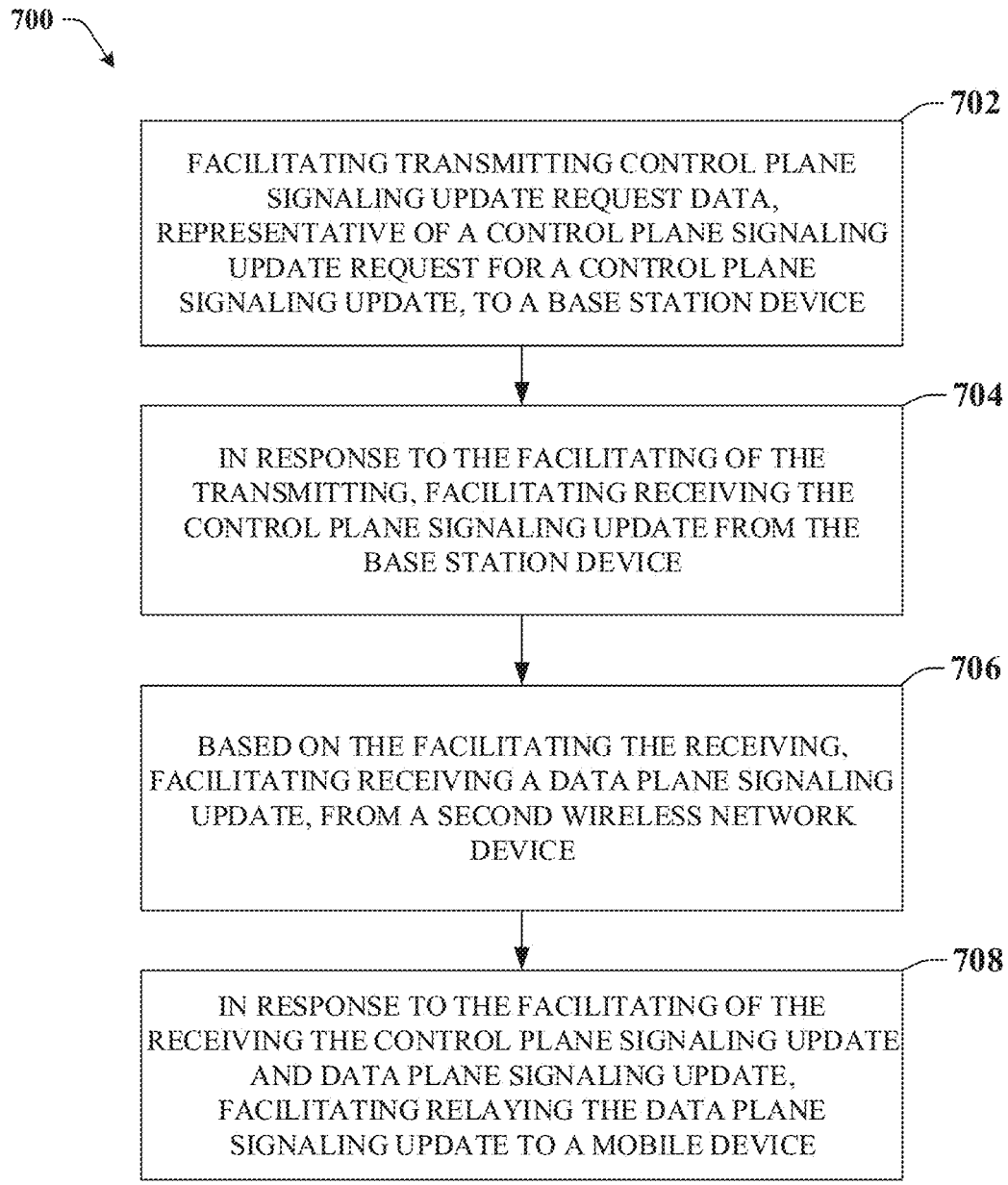
FIG. 7 illustrates an example flow diagram of a method for facilitating integrated access backhaul according to one or more embodiments.

Referring now to FIG. 7, illustrated is an example flow diagram of a method 700 for facilitating integrated access backhaul according to one or more embodiments. At element 702, the method can comprise facilitating, transmitting control plane signaling update request data (e.g. from the relay distributed unit $308_1$), representative of a control plane signaling update request for a control plane signaling update, to a base station device (e.g., LTE eNB 204). In response to the facilitating of the transmitting, the method can comprise facilitating, receiving (e.g. by the relay distributed unit $308_1$) the control plane signaling update from the base station device (e.g., LTE eNB 204) at element 704. Additionally, based on the facilitating the receiving, the method can comprise facilitating receiving (e.g. by the relay distributed unit $308_1$) a data plane signaling update, from a second wireless network device (e.g., LTE eNB 204) at element 706. Furthermore, in response to the facilitating of the receiving the control plane signaling update and data plane signaling update, at element 708, the method can comprise facilitating, relaying (e.g. by the relay distributed unit $308_1$) the data plane signaling update to a mobile device.

Figure 8:
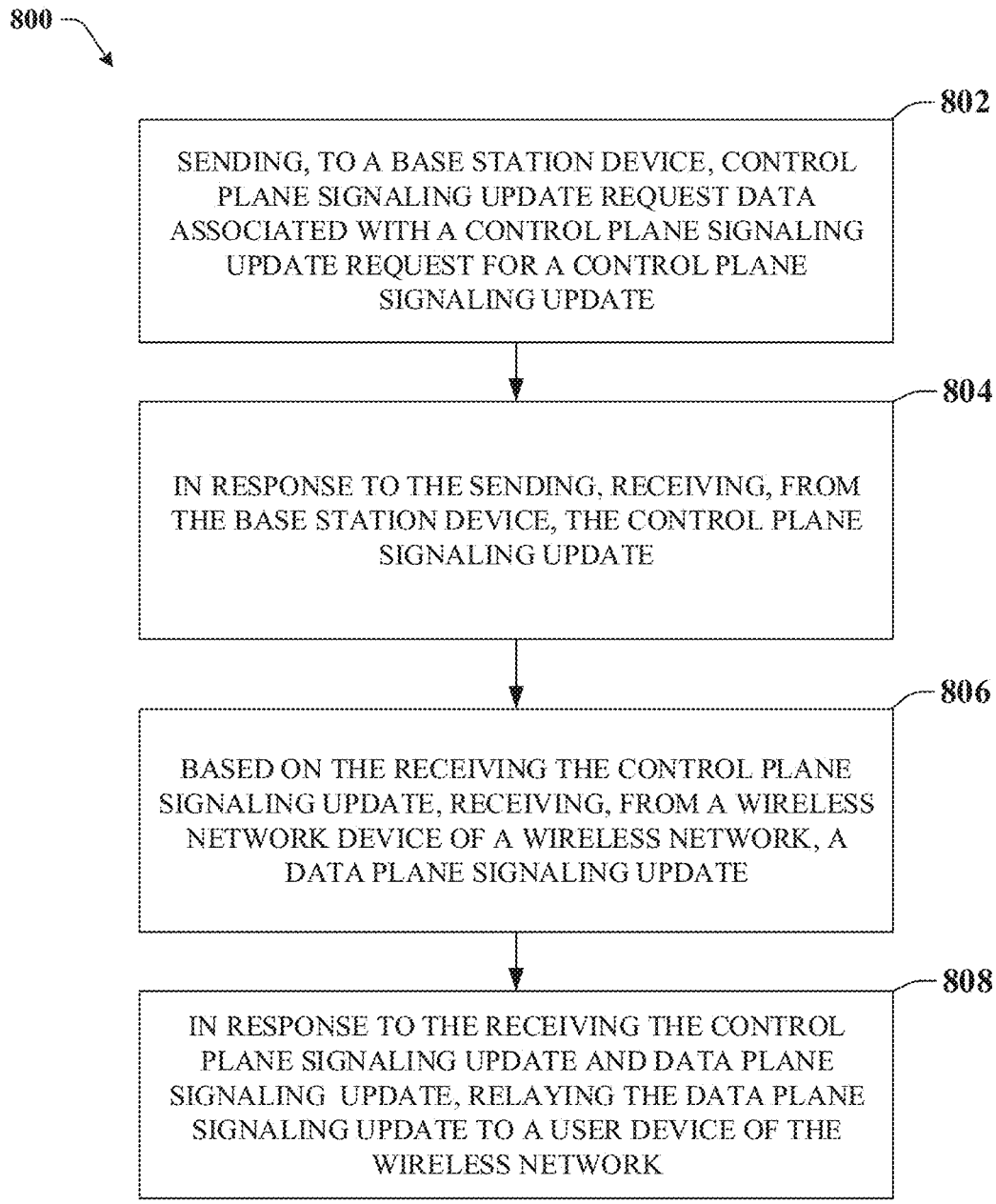
FIG. 8 illustrates an example flow diagram of a system for facilitating integrated access backhaul according to one or more embodiments.

Referring now to FIG. 8, illustrated is an example flow diagram of a system 800 for facilitating integrated access backhaul according to one or more embodiments. At element 802, the system can comprise sending (e.g. from the relay distributed unit $308_1$), to a base station device (e.g., LTE eNB 204), control plane signaling update request data associated with a control plane signaling update request for a control plane signaling update. In response to the sending, the system can comprise receiving (e.g. by the relay distributed unit $308_1$), from the base station device (e.g., LTE eNB 204), the control plane signaling update at element 804. Additionally, based on the receiving the control plane signaling update the system can receive, from a wireless network device (e.g., LTE eNB 204) of a wireless network, a data plane signaling update at element 806. Furthermore, in response to the receiving the control plane signaling update (e.g. from the relay distributed unit $308_1$) and data plane signaling update, the system can comprise relaying (e.g. from the relay distributed unit $308_1$), to a user device of the wireless network (e.g., UE 102), the data plane signaling update at element 808.

Figure 9:
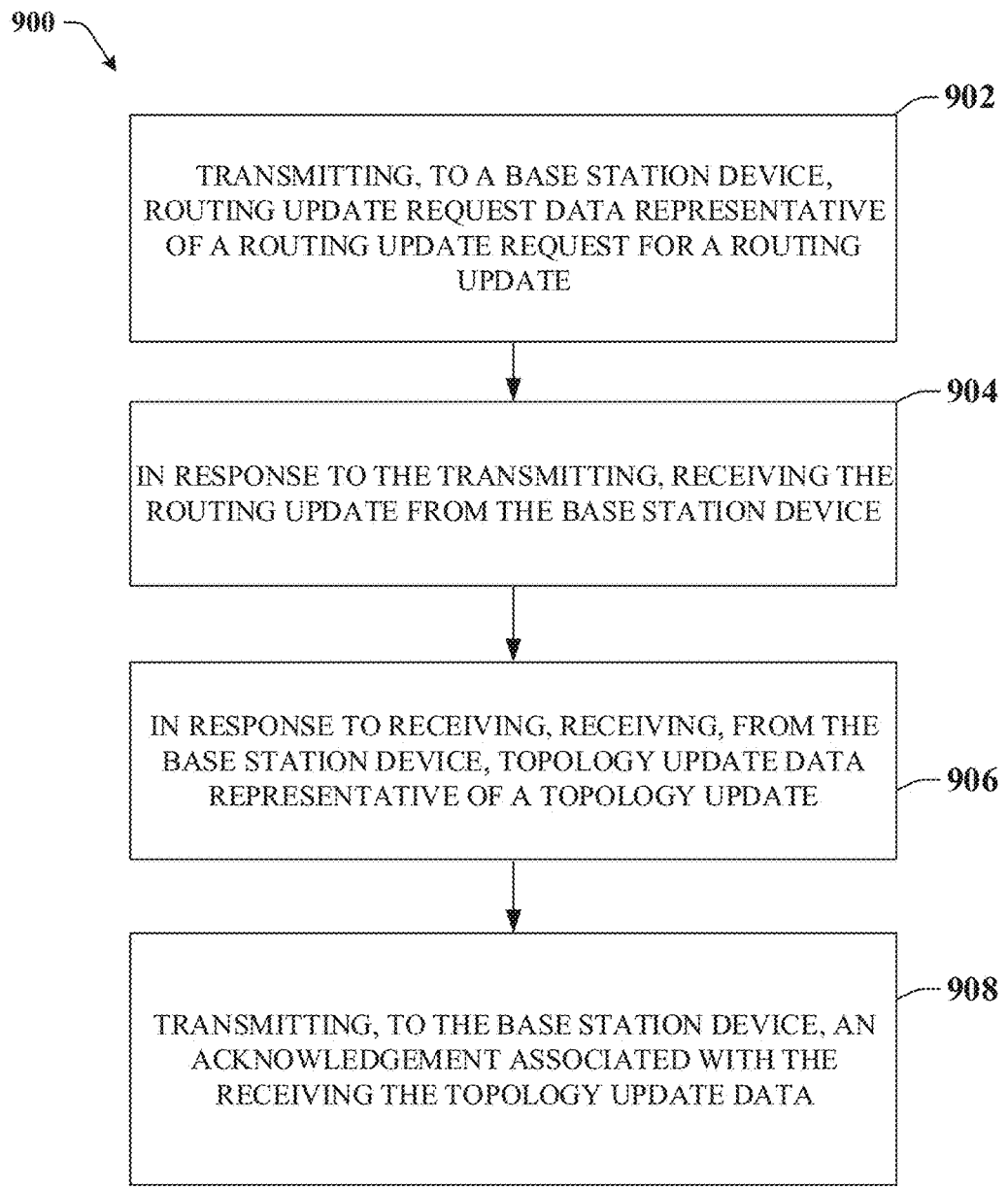
FIG. 9 illustrates an example flow diagram of machine-readable medium that facilitate integrated access backhaul according to one or more embodiments.

Referring now to FIG. 9, illustrates an example flow diagram of machine-readable medium 900 that facilitate integrated access backhaul according to one or more embodiments. At element 902, the operations of the machine-readable medium can comprise transmitting, to a base station device (e.g., LTE eNB 204), routing update request data representative of a routing update request for a routing update (e.g. from the relay distributed unit $308_1$). In response to the transmitting, the operations can comprise receiving (e.g. by the relay distributed unit $308_1$) the routing update from the base station device (e.g., LTE eNB 204) at element 904. Additionally, at element 906, the operations can comprise receiving (e.g. by the relay distributed unit $308_1$), from the base station device (e.g., LTE eNB 204), topology update data representative of a topology update, in response to receiving. Consequently, at element 908, the operations can comprise transmitting (e.g. by the relay distributed unit $308_1$), to the base station device (e.g., LTE eNB 204), an acknowledgement associated with the receiving the topology update data.

Figure 10:
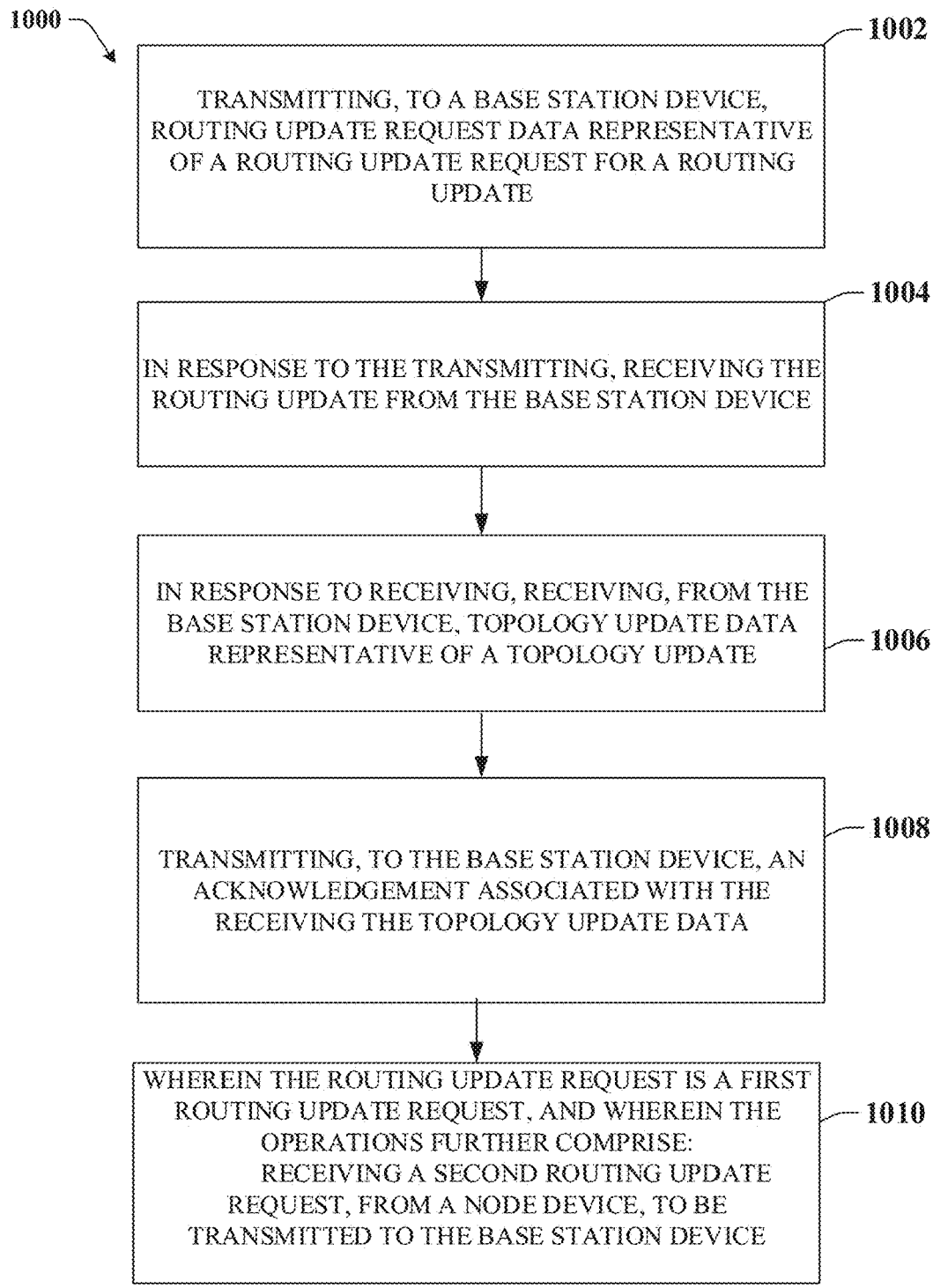
FIG. 10 illustrates an example flow diagram of machine-readable medium that facilitate integrated access backhaul according to one or more embodiments.

Referring now to FIG. 10, illustrated is an example flow diagram of machine-readable medium 1000 that facilitate integrated access backhaul according to one or more embodiments. At element 1002, the operations of the machine-readable medium can comprise transmitting, to a base station device (e.g., LTE eNB 204), routing update request data representative of a routing update request for a routing update (e.g. from the relay distributed unit $308_1$). In response to the transmitting, the operations can comprise receiving (e.g. by the relay distributed unit $308_1$) the routing update from the base station device (e.g., LTE eNB 204) at element 1004. Additionally, at element 1006, the operations can comprise receiving (e.g. by the relay distributed unit $308_1$), from the base station device (e.g., LTE eNB 204), topology update data representative of a topology update, in response to receiving. Consequently, at element 1008, the operations can comprise transmitting (e.g. by the relay distributed unit $308_1$), to the base station device (e.g., LTE eNB 204), an acknowledgement associated with the receiving the topology update data. Furthermore, wherein the routing update request is a first routing update request, at element 1010, the operations can further comprise receiving a second routing update request, from a node device (e.g. by the relay distributed unit $308_2$), to be transmitted to the base station device (e.g., LTE eNB 204).

Figure 11:
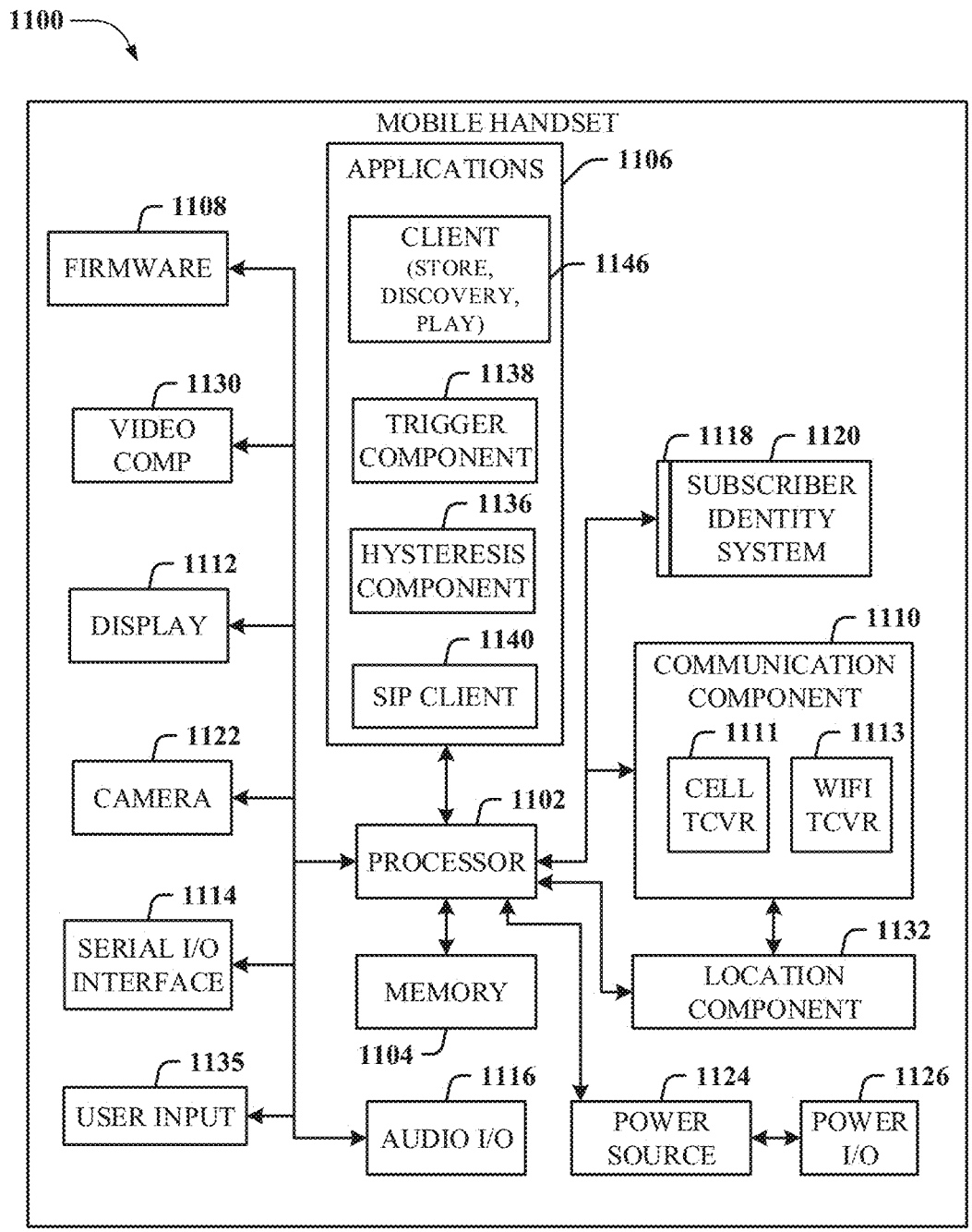
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
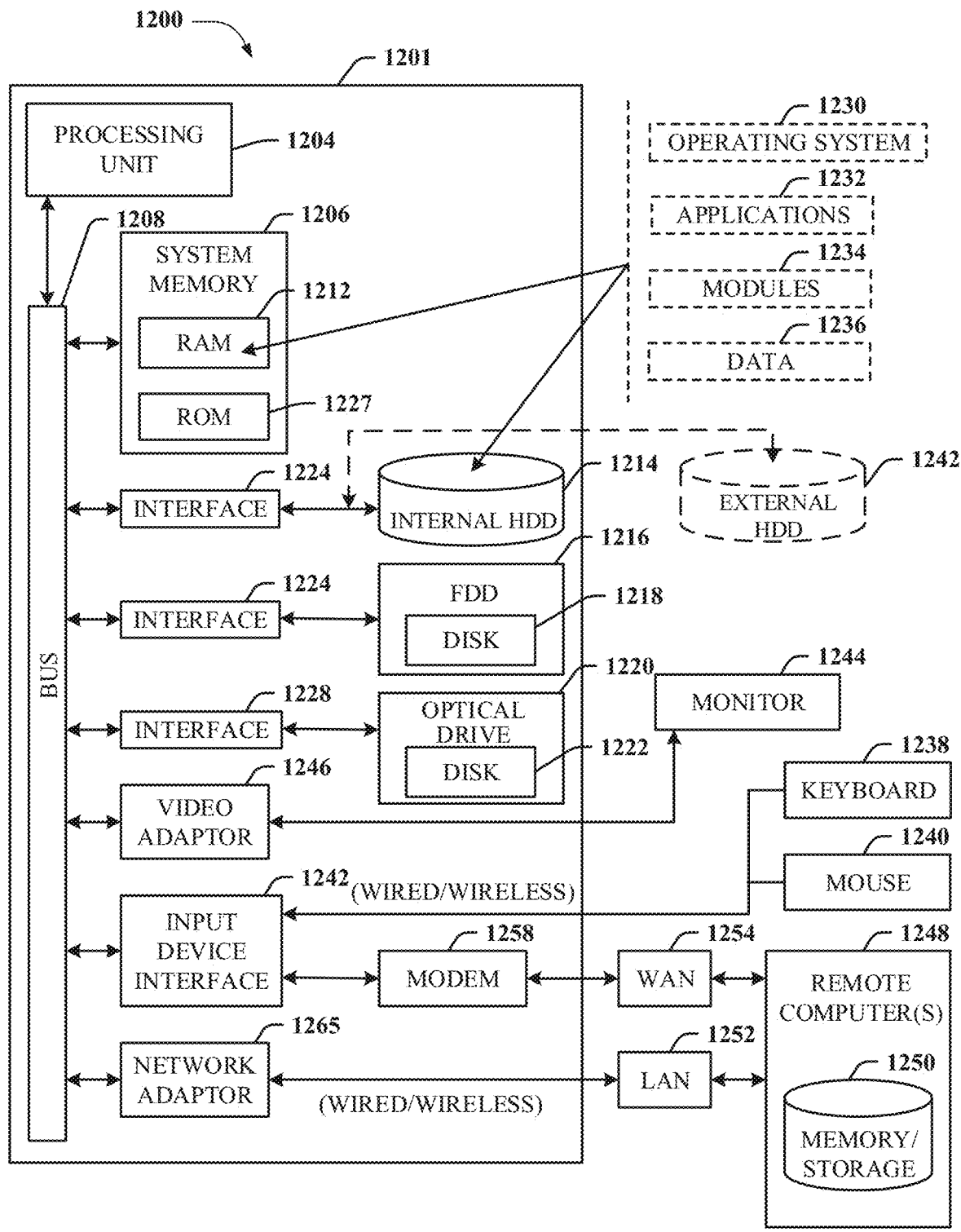
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/ storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In a 5G network, new radios (NR) can be deployed as a standalone radio access technology or as a non-standalone radio access technology assisted by another radio access technology. Long-term evolution (LTE), which is widely deployed can provide seamless coverage and uninterrupted connectivity, however NRs can provide significantly increased data rates or new services. However, the deployment of NR can be limited to hotspots under the footprint of LTE. Therefore, dual connectivity between LTE and NR can be utilized for non-standalone NR because control plane functions can be sent over LTE while the data plane can be managed on NR, allowing for simplified NR deployments where device support for both LTE and NR is available.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
facilitating, by a first wireless network device comprising a processor, transmitting first control plane signaling update request data, representative of a first control plane signaling update request for a control plane signaling update, to a base station device;
in response to the facilitating of the transmitting, facilitating, by the first wireless network device, receiving the control plane signaling update from the base station device;
receiving, by the first wireless network device, second control plane signaling update request data representative of second control plane signaling update requests;
in response to the receiving the second control plane signaling update request data, aggregating, by the first wireless network device, the second control plane signaling update requests resulting in aggregated second control plane signaling update requests;
sending, by the first wireless network device, the aggregated second control plane signaling update requests to the base station device on behalf of node devices;
based on the facilitating the receiving, facilitating, by the first wireless network device, receiving a data plane signaling update, representative of a data plane update, from a second wireless network device; and
in response to the facilitating of the receiving the control plane signaling update and data plane signaling update, facilitating, by the first wireless network device, relaying the data plane signaling update to a mobile device.

2. The method of claim 1, wherein the facilitating of the transmitting the control plane signaling update is performed in response to a routing change event being determined to have occurred.

3. The method of claim 2, wherein the control plane signaling update is received in response to a topology change event being determined to have occurred.

4. The method of claim 1, wherein the first wireless network device is configured to be a primary node device capable of transmitting the second control signaling update request on behalf of a secondary node device.

5. The method of claim 4, wherein the first wireless network device is configured to be the primary node device based on a hop order associated with the first wireless network device.

6. The method of claim 1, wherein the control plane signaling update comprises radio link data representative of one or more radio link measurements.

7. The method of claim 1, wherein the control plane signaling update comprises instruction data representative of an instruction to perform a routing change.

8. A system, comprising:
a processor; and
a memory that stores executable instructions that, when executed by the processor, facilitate performance of operations, comprising:
sending, to a base station device, first control plane signaling update request data associated with a first control plane signaling update request for control plane signaling updates;
in response to the sending, receiving, from the base station device, the control plane signaling updates;
receiving, from node devices, second control plane signaling update request data representative of second control plane signaling update requests;
in response to the receiving the second control plane signaling update request data, aggregating the second control plane signaling update requests to generate a third control plane signaling update request representative of aggregated second control plane signaling update requests;

based on the receiving the control plane signaling updates, receiving, from a wireless network device of a wireless network, a data plane signaling update; and in response to the receiving the control plane signaling updates and data plane signaling update, relaying the data plane signaling update to a user device of the wireless network.

9. The system of claim 8, wherein the first control plane signaling update request data comprises routing update request data representative of a routing update request.

10. The system of claim 8, wherein the first control plane signaling update request data comprises update request data representative of a backhaul link radio resource configuration update request.

11. The system of claim 8, wherein the first control plane signaling update request data is received within a unicast control message.

12. The system of claim 8, wherein the receiving the control plane signaling updates occurs concurrently with a node device, of the node devices, receiving the control plane signaling updates.

13. The system of claim 8, wherein the operations further comprise:

sending the aggregated second control plane signaling update requests to the base station device on behalf of the node devices.

14. The system of claim 13, wherein the receiving the control plane signaling updates comprises:

in response to the sending the aggregated second control plane signaling update requests, receiving the control plane signaling updates to be sent to the node devices.

15. A non-transitory machine-readable storage medium, comprising executable instructions that, when executed by a processor, facilitate performance of operations, comprising:

transmitting, to a base station device, routing update request data representative of a routing update request for a routing update;

in response to the transmitting, receiving the routing update from the base station device;

receiving, from node devices, first control plane signaling update request data representative of first control plane signaling update requests;

in response to the receiving the first control plane signaling update request data, aggregating the first control plane signaling update requests to generate a second control plane signaling update request representative of aggregated first control plane signaling update requests;

in response to sending the aggregated first control plane signaling update requests, receiving, from the base station device, control plane signaling updates to be sent to the node devices;

based on the receiving the routing update, receiving, from the base station device, topology update data representative of a topology update; and transmitting, to the base station device, an acknowledgement associated with the receiving the topology update data.

16. The non-transitory machine-readable storage medium of claim 15, wherein the routing update request is a first routing update request, and wherein the operations further comprise:

receiving a second routing update request, from a node device, to be transmitted to the base station device.

17. The non-transitory machine-readable storage medium of claim 15, wherein the topology update is a first topology update, and wherein the operations further comprise:

receiving a second topology update from a node device.

18. The non-transitory machine-readable storage medium of claim 17, wherein the operations further comprise:

aggregating the first topology update and the second topology update to generate a third topology update comprising the first topology update and the second topology update.

19. The non-transitory machine-readable storage medium of claim 15, wherein the receiving the topology update data comprises receiving the topology update data concurrently with a node device receiving the topology update data.

20. The non-transitory machine-readable storage medium of claim 15, wherein the routing update is received within a unicast control message.

\* \* \* \* \*